United States Patent [19]

Meyer

[11] 4,047,043

[45] Sept. 6, 1977

[54] IRRADIATION INSTALLATION FOR IONIZING RADIATION

[75] Inventor: Rudolf Meyer, Erlangen, Germany

[73] Assignee: Siemens Aktiengesellschaft, Berlin & Munich, Germany

[21] Appl. No.: 652,577

[22] Filed: Jan. 26, 1976

[30] Foreign Application Priority Data

June 12, 1975 Germany .............................. 2526294

[51] Int. Cl.² ................................................ G01T 1/00
[52] U.S. Cl. ...................................... 250/401; 250/336
[58] Field of Search .................................. 250/401, 336

[56] References Cited

U.S. PATENT DOCUMENTS

| | | | |
|---|---|---|---|
| 3,911,273 | 10/1975 | Franke | 250/401 X |
| 3,949,229 | 4/1976 | Albert | 250/401 |
| 3,952,201 | 4/1976 | Hounsfield | 250/401 X |

Primary Examiner—Archie R. Borchelt
Attorney, Agent, or Firm—Hill, Gross, Simpson, Van Santen, Steadman, Chiara & Simpson

[57] ABSTRACT

An irradiation or exposure installation for ionizing radiation, with at least one radiation detector exposed to the radiation, including a radiation monitor for the presetting of the radiation dosage which is to be currently applied and for the limitation of the latter to the presently preset reference value, including a preadjustable integrating unit which is connected to the radiation monitor, and with an automatic shut-off device actuatable through intermediary of the integrating unit upon reaching of the preset radiation dosage.

5 Claims, 2 Drawing Figures

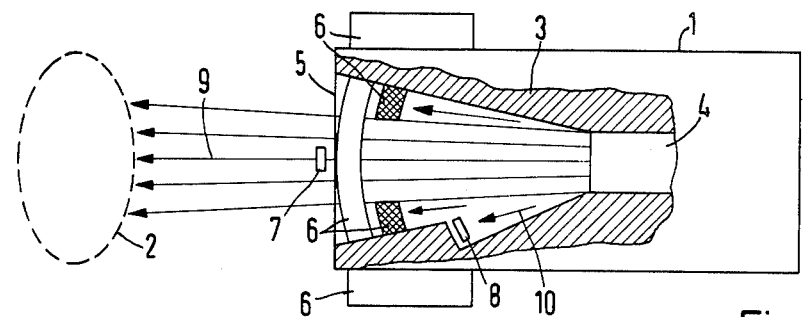
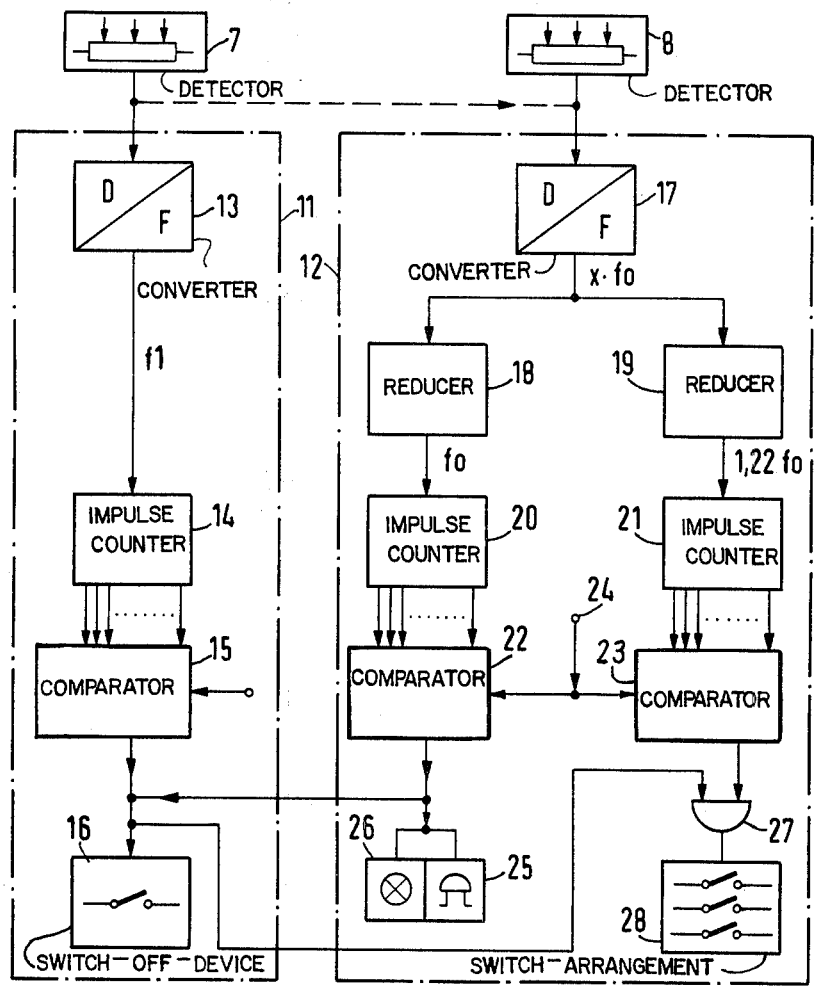

IRRADIATION INSTALLATION FOR IONIZING RADIATION

FIELD OF THE INVENTION

The present invention relates to an irradiation or exposure installation for ionizing radiation, with at least one radiation detector exposed to the radiation, including a radiation monitor for the presetting of the radiation dosage which is to be currently applied and for the limitation of the latter to the presently preset reference value, including a preadjustable integrating unit which is connected to the radiation monitor, and with an automatic shut-off device actuatable through intermediary of the integrating unit upon reaching of the preset radiation dosage.

DISCUSSION OF THE PRIOR ART

Irradiation installations employed in industry and research, however in particular, irradiation installations utilized in the medical technology switch off automatically after the application of a predetermined radiation dosage. Hereby, a radiation detector generally is exposed to the emerging radiation, and the signals of the radiation detector are transmitted to an automatic switch-off or disconnect device through a preadjustable integrating stage, in effect, the so-called radiation monitor. However, in such known irradiation installations it has been found to be disadvantageous that through a defect present in one of the components, through aging-caused or thermally-caused changes in the tolerance limits of the components, or through changes in the radiation discharge, the thereby resultant inhomogenieties in the radiation cone can lead to the delivery of either excessive or inadequate radiation doses. This leads in all instances to erroneous exposures during material investigations. In the medical technology this may have consequences affecting the life and health of a patient.

It has also already been proposed to connect two identically constructed radiation monitors in parallel. Upon the failure of one radiation monitor there can thus be obtained at least the switch-off signal through the other radiation monitor. Upon setting of the second radiation monitor to a somewhat excessively high reference value, in this manner it may even be determined if the first radiation monitor has switched-off too late, meaning, if it has exceeded the set positive tolerance. Nevertheless, it is a disadvantage of the parallel connection of two radiation monitors that the important determination of the first radiation monitor having satisfactorily functioned is not applicable, inasmuch as a premature switching-off meaning an exceeding of the minus tolerance, is thereby not determinable.

SUMMARY OF THE INVENTION

Accordingly, it is an object of the present invention to increase the assurance or safety of irradiation installations and, in particular, to monitor the plus as well as also the minus tolerance excesses of the radiation monitor at the lowest possible requirements. Hereby, the deliveries of excessive radiation doses are prevented in each instance at also the complete failure of the radiation monitor.

In a radiation installation of the above-mentioned type, there is thereby inventively provided an additional control monitor for the surveillance of the plus as well as also the minus tolerance of the radiation monitor, and with the control monitor being equipped with a dose rate frequency converter for the conversion of the signals of a radiation detector into a frequency proportioned to the dose rate, including two differing frequency reducers which are connected to the output of the converter, whose investigative ratios deviate from each other by about the just tolerable error band width, and each with an impulse counter connected to one of the two frequency reducers impulse counter having a digital comparator connected to the output thereof with a common presettable counting capacity, wherein the output of the digital comparator associated with the more intensively reducing reducer is connected to the automatic switch-off device, and the output of the digital comparator associated with the less intensively reducing reducer is connected to a main protector for blocking off the entire irradiation installation, and the input of the dose output frequency converter is connected with the radiation detector. This solution is predicated on the knowledge that an effective control over the radiation monitor is only provided when plus, as well as also minus tolerance excesses are determined dependably and automatically. The foregoing is attained through this construction. Thereby, the additional requirement is maintained within bounds, inasmuch as there are employed only commercially available digital components. Moreover, at a complete failure of the radiation monitor, the control monitor takes over the function thereof and switches off the irradiation installation after an exceeding of the preset reference values of the radiation dosage by the predetermined value of the error band width or range. However, if the radiation monitor switches off the irradiation installation prematurely due to another defect by more than the therewith assigned error band width, then the control monitor cannot reverse this, but can alert the operating personnel to this error through a blocking of the entire irradiation installation.

In a particular advantageous further construction of the invention, the control monitor may be connected to a separate radiation detector which is located at the side of the central or main beam. This has the advantage that not only are there noticed such errors which have their origin within the radiation monitor but, as a result of the arrangement of the second radiation detector exteriorly of the central beam there are also noticed such errors which emanate either from the radiation detector itself or which have their origin in the deviating dose outputs of the central beam. Accordingly, there are also noticed erroneously inserted or subsequently flawed radiation filters, respectively, their satisfactory function is thereby surveilled.

In a suitable embodiment of the invention, the reduction ratios of the reducers for surveillance, inclusive of a plus as well as also a minus tolerance of about 10%, are maintained at about 1:2.22 relative to each other. When the preselection of the digital comparators is so set that the impulse counter of the control monitor with the somewhat lower input frequency, reaching the count position corresponding to the reference value at a reference value of about 10% higher reference value, then the counter with the somewhat higher input frequency also automatically reaches the count position corresponding to the reference value at an about 10% lower reference value. When the preselection is correspondingly adjusted or set, which may be simplified through calibration of the regulator for the preselection of the digital comparators, then by means of the two digital comparators of the control monitor there are surveilled positive as well as also negative tolerance excesses of 10%. This has the result that the digital comparators with the higher count input frequency will always activate the blocking installation connected to the output thereof when the automatic switch-off device switches off at more than 10% ahead of the dose reference value which is detected by the control monitor. The digital comparator of the control monitor with the somewhat lower input frequency, in contrast therewith, transmits a switching impulse to the automatic switch-off device of the radiation detector connected thereto when the radiation dosage has exceeded the reference value by more than 10%.

BRIEF DESCRIPTION OF THE DRAWINGS

Reference may now be had to the following detailed description of an exemplary embodiment of the invention, taken in conjunction with the accompanying drawings; in which:

FIG. 1 illustrates a longitudinal sectional view through an irradiation installation shown in a considerably simplified and schematic representation; and FIG. 2 illustrates a schematic circuit block diagram representative of the construction of the radiation monitor and the control monitor.

DETAILED DESCRIPTION

Ascertainable in FIG. 1 of the drawings is an irradiation or exposure installation 1 and an object 2 which is to be irradiated, the latter of which may also represent a patient. The irradiation installation contains a radiation source 4 which is encompassed by a protective radiation shielding 3 such as, for example, a source carrier for a radioisotope, an X-ray tube, or the accelerating tube of a linear accelerator, or a betatron. The outlet or delivery aperture 5 for the radiation is closeable by means of a shutter-control system 6 (Bucky diaphragm). Located directly in front of the outlet aperture 5 of the irradiation installation 1 is a radiation detector 7. A second radiation detector 8 is arranged interiorly of the protective radiation shield 3 of the irradiation installation 1, and exteriorly of the central beam 9, however, within the range of the radiation 10 emanating from the radiation source 4.

FIG. 2 illustrates the construction of the two monitor systems 11, 12 for the surveillance of the irradiation or exposure installation 1. The radiation monitor 11, in its construction, corresponds to the known monitors of medical irradiation installations. The radiation detector 7 is connected to a dose rate frequency converter 13, for example, a "Teledyne Philbrick" voltage-to-frequency converter 4701, whose output is connected to an impulse counter 14, for example, a "Motorola" BCD rate multiplier MC 14, 527. The outputs of the impulse counter are connected to a preset digital comparator 15, for example, a "Motorola" 4-bit magnitude comparator MC 14 585. The output of this digital comparator is connected with an automatic switch-off device 16 (as disclosed in U.S. Pat. No. 3,284,631), by means of which there can be switched off irradiation installation 1 as soon as there has been applied the preset dose. Connected in parallel to the radiation monitor 11 there may be ascertained the control monitor 12. The latter similarly contains a dose rate frequency-converter 17, for example, a "Teledyne Philbrick" voltage-to-frequency converter 4701 which is connected either to the radiation detector 7 of the radiation monitor 11 or, preferably, to the second radiation detector 8 of the irradiation installation 1, which is located at the side of the central beam 9. The output of the dose rate frequency converter 17, however, is connected to two differing reducers 18, 19, for example, "Motorola" BCD rate multiplier MC 4 527, of which the one reducer 18 generates a frequency fo and the other reducer a frequency of 1.22 fo. Both reducer outputs are each respectively connected to an impulse counter 20, 21, for example a "Motorola" BCD rate multiplier MC 14 527, to which, in turn, there is presently connected to the outputs thereof a digital comparator 22, 23, for example, a "Motorola" 4-bit magnitude comparator MC 14 585. The two digital comparators 22, 23 are preset to the same value through a common adjusting input 24. The ouput of the digital comparator 22 which is associated with the reduced frequency of fo is connected to the automatic switch-off device 16 of the radiation monitor 11. Moreover, the output is connected with an optical and an acoustic signal installation 25, 26. The digital-comparator 23 which is associated with the reducer frequency of 1.22 fo is connected to a switch arrangement 28 (as disclosed in U.S. Pat. No. 3,284,631), through an AND-gate 27 which is also connected with the automatic switch-off device, for blocking the radiation installation, such as for example, a protector.

The radiation which emerges from the irradiation installation passes through the radiation detector 7 of the radiation monitor 11 with its central beam before it reaches the object 2 which is to be irradiated, respectively, the patient. The signals of this radiation detector 7 are converted into a frequency f1 proportional to the dose rate by the dose rate frequency converter 13. Through intermediary of this frequency there is controlled the impulse counter 14. The digital comparator which is associated with the output of this impulse counter, the former of which can be preset by the physician in correspondence with the radiation dosage which is to be applied, connects the output signal of the impulse counter 14, which corresponds to the preset dose, to the automatic switch-off device. Thus controlled, the latter switches off the irradiation installation 1.

However, during the irradiation or exposure the second radiation detector 8 which, in the exemplary embodiment, is associated with the control monitor 12, is also exposed to the radiation. The signals of this second radiation detector appear at the input of the dose rate frequency converter 17 and produce there a frequency $X \cdot fo$ which is proportional to the measured dose rate. This frequency may strongly deviate from the frequency f1 of the dose rate frequency converter 13 due to the other kind of radiation density present at the location of the second radiation detector 8, as a result of a different sensitivity of this second radiation detector, and also as well as through deviating conversion characteristics of the dose rate frequency converter 17 in the control monitor 12. Through intermediary of the two reducers 18 and 19 which are connected to the output of the dose rate frequency converter 17 of the control monitor, there is reduced the frequency $x \cdot fo$. This may be carried out, for example, at a factor of $10^4$. Thereby, the two reducers 18, 19 of the control monitor 12 are so selected that their reduction ratios differ by the factor of 1.22 when willing to still allow for tolerance deviations of ± 10%. This distinction is obtained in that, for the surveillance of the plus and the minus tolerance at a presently 10% deviation, there is obtained 109:90.1 = 1.219, or respectively 1.22. The digital comparators 22, 23 which are connected to the outputs of the two impulse counters 18, 19 of the control monitor are preset to the same count condition by means of a common adjusting input 24. Thereby this presetting, under consideration of the different impulse frequencies, which are conducted to the impulse counters of the control monitor and the radiation monitor is under certain circumstances quite different from that of the presetting of the digitial comparator 15 of the radiation monitor 11. However, it is constant for radiation installation 1 so that also the digital comparator of the radiation monitor 11 and the control monitor 12 can be commonly adjusted by means of a corresponding reducing adjusting element to the selected reference value of the radiation dosage. In accordance therewith, the digital comparators 15, 22, 23 are so correlated that the digital comparator 22 which is connected to the output of the reducer 18 having the output frequency fo is activated only at a radiation dosage lying at 10% over the reference value, the digital comparator 15 of the radiation monitor at the dose rate corresponding to the reference value, and the digital comparator 23 which is associated with the reducer 19 having the output frequency 1.22 fo is activated at a dosage lying at about 10% below the reference value. This has the result that when the automatic switch-off device 16 of the radiation monitor 11 is not or not time actuated by the digital comparator 15 but at least at a dosage which lies 10% above the preset reference value, it is controlled by the digital comparator 22 of the control monitor 12. In those instances, however, in which the radiation monitor 11 switches off the radiation by more than 10% prior to the preset dosage, the blocking of the installation is initiated through the output of the digital comparator 23 which carries a signal preceding the reaching of the preset reference value, across the AND-gate 27. In this manner, the operating personnel is made cognizant of the premature switching off of the irradiation or exposure by means of the automatic switch-off device 16, meaning the minus tolerance exceeding of the latter.

While there has been shown what is considered to be the preferred embodiment of the invention, it will be obvious that modifications may be made which come within the scope of the disclosure of the specification.

What is claimed is:

1. In an irradiation installation for ionizing radiation, including at least one radiation detector exposed to the radiation; a first radiation monitor for presetting of the radiation dosage to be currently applied and for the limiting thereof to a currently preset reference value; a presettable integrating unit connected to said radiation detector; and automatic switch-off means for said installation activated by said integrating unit responsive to reaching of said preset radiation dosage, the improvement comprising: a second control radiation monitor for surveilling the plus and minus tolerance of said first radiation monitor, said second radiation monitor including a dose rate frequency converter for converting the signals of said radiation detector into a frequency proportional to the dose rate, two differing frequency reducers being connected to the output of said dose rate frequency converter, said reducers having reduction ratios deviating from each other within a tolerable error band width, impulse counters being connected one each to respectively one of said two frequency reducers, and digital comparators having a commonly presettable count capacity being connected to the outputs of each of said two frequency reducers, the output of the digital comparator associated with the more extensively reducing reducer being connected with said automatic switch-off means, the output of the digital comparator associated with the less extensively reducing reducer being connected to a main protector for blocking of the entire irradiation installation, and the input of said dose rate frequency converter being connected with said radiation detector.

2. An installation as claimed in claim 1, comprising a second separate radiation detector located at the side of the central beam of the radiation, said second radiation detector being connected to said second control radiation monitor.

3. An installation as claimed in claim 1, said frequency reducers having a transition ratio for surveillance, inclusive a plus-and a minus tolerance of about 10%, of 1:1.22 relative to each other.

4. An installation as claimed in claim 1, comprising an acoustic signal installation connected to the output of said digital comparator.

5. An installation as claimed in claim 1, comprising an optical signal installation connected to the output of said digital comparator.

* * * * *